United States Patent [19]

Dörner

[11] 4,437,582

[45] Mar. 20, 1984

[54] DEVICE FOR DISPENSING PASTE-LIKE SUBSTANCES

[75] Inventor: Florian Dörner, Düsseldorf, Fed. Rep. of Germany

[73] Assignee: Bayer Aktiengesellschaft, Leverkusen, Fed. Rep. of Germany

[21] Appl. No.: 414,225

[22] Filed: Sep. 2, 1982

[30] Foreign Application Priority Data

Sep. 23, 1981 [DE] Fed. Rep. of Germany ....... 3137760

[51] Int. Cl.$^3$ .............................................. B05B 11/04
[52] U.S. Cl. ....................................... 222/94; 222/495
[58] Field of Search ............... 222/207, 386, 453, 209, 222/94, 106, 495, 496, 106

[56] References Cited

U.S. PATENT DOCUMENTS 2,681,170  6/1954  Elliot ............................... 222/495 X Primary Examiner—Stanley H. Tollberg
Attorney, Agent, or Firm—Sprung, Horn, Kramer & Woods

[57] ABSTRACT

The device is based on a metering chamber which is designed to be screwed onto a tube and which has inlet and outlet openings for the product. The product is dispensed by a plunger displaceable in the metering chamber. An axially displaceable plate valve is arranged between the plunger and the bottom of the metering chamber. The valve plate is provided with holes for the passage of product. The plate valve functions such that the valve plate closes the outlet opening during filling of the metering chamber and the inlet openings during emptying of the metering chamber. The dispenser may be screwed onto standard commercial tube packs for the application of salves or pastes.

8 Claims, 6 Drawing Figures

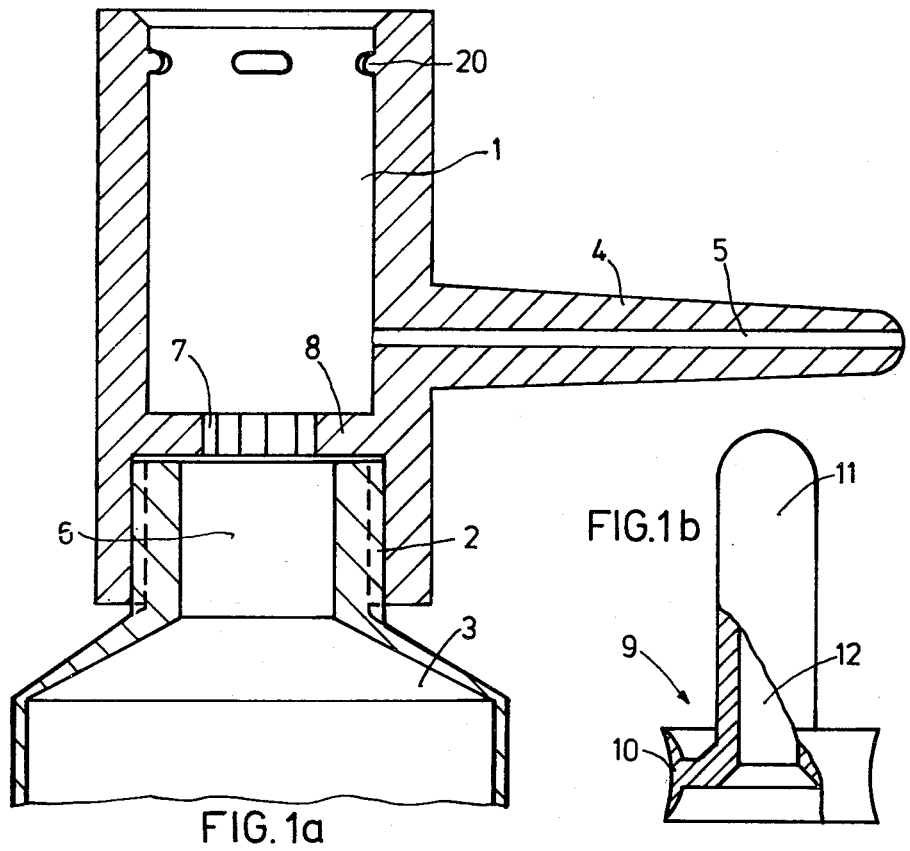
FIG. 1a
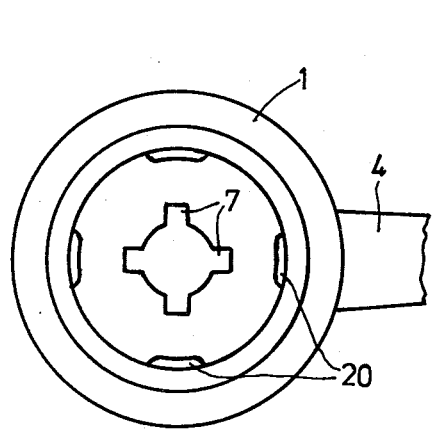
FIG. 2
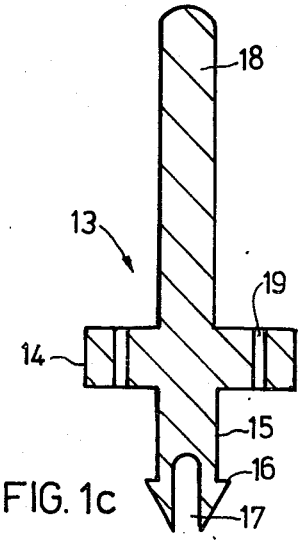
FIG. 1b
FIG. 1c

DEVICE FOR DISPENSING PASTE-LIKE SUBSTANCES

BACKGROUND OF THE INVENTION

This invention relates to a device for dispensing paste-like substances from a tube, the device comprising a metering chamber provided with inlet and outlet openings and designed to be screwed onto the tube.

The application of salves from metal or plastic tubes frequently involves the problem of applying a uniform quantity. Beginning with this problem, the object of the present invention is to provide a simple and inexpensive dispensing device which may be fitted onto the tube and which enables a uniform quantity of the paste-like or gel-like product accommodated in the tube to be dispensed.

SUMMARY OF THE INVENTION

According to the invention, this object is achieved by a device comprising a metering chamber with inlet and outlet openings for the product which is designed to be screwed onto the tube, the invention being characterized in that an axially displaceable plunger operated by an outwardly projecting pushrod is provided in the metering chamber and in that a plate valve which is provided with holes for the passage of the product and which is also axially displaceable in the metering chamber is additionally present and is adapted to close the outlet opening during filling of the metering chamber and the inlet opening during emptying of the metering chamber. This function is performed by means of stops. In one preferred embodiment, the valve plate is provided underneath with an axial pin which extends into the neck to the tube and of which the end is in the form of a stop. This limits the travel of the valve plate in the upward direction.

The axial pin is preferably slotted crosswise and conically shaped at its end.

The openings in the base of the metering chamber and the axially parallel bores in the valve plate are advantageously laterally offset from one another.

The dispenser according to the invention has the following advantages:

It is light, easy to handle, safe in operation and inexpensive to produce by injection molding. These properties are essential in cases where the dispenser for tube packs is directly supplied by the manufacturer. The dispenser according to the invention may be used particularly in the pharmaceutical industry (salves and gels) and also in the technical field in the marketing of resins, adhesives or filling compositions which have to be mixed from several components in a predetermined ratio.

One example of an embodiment of the invention is described in the following with reference to the accompanying drawings, wherein:

BRIEF DESCRIPTION OF THE DRAWINGS

FIGS. 1a to 1c show the individual components of the dispenser in elevation, FIG. 1a showing the housing, FIG. 1b the plunger and FIG. 1c the plate valve;

FIG. 2 is a plan view of the housing;

DETAILED DESCRIPTION OF THE INVENTION

Figure 3:
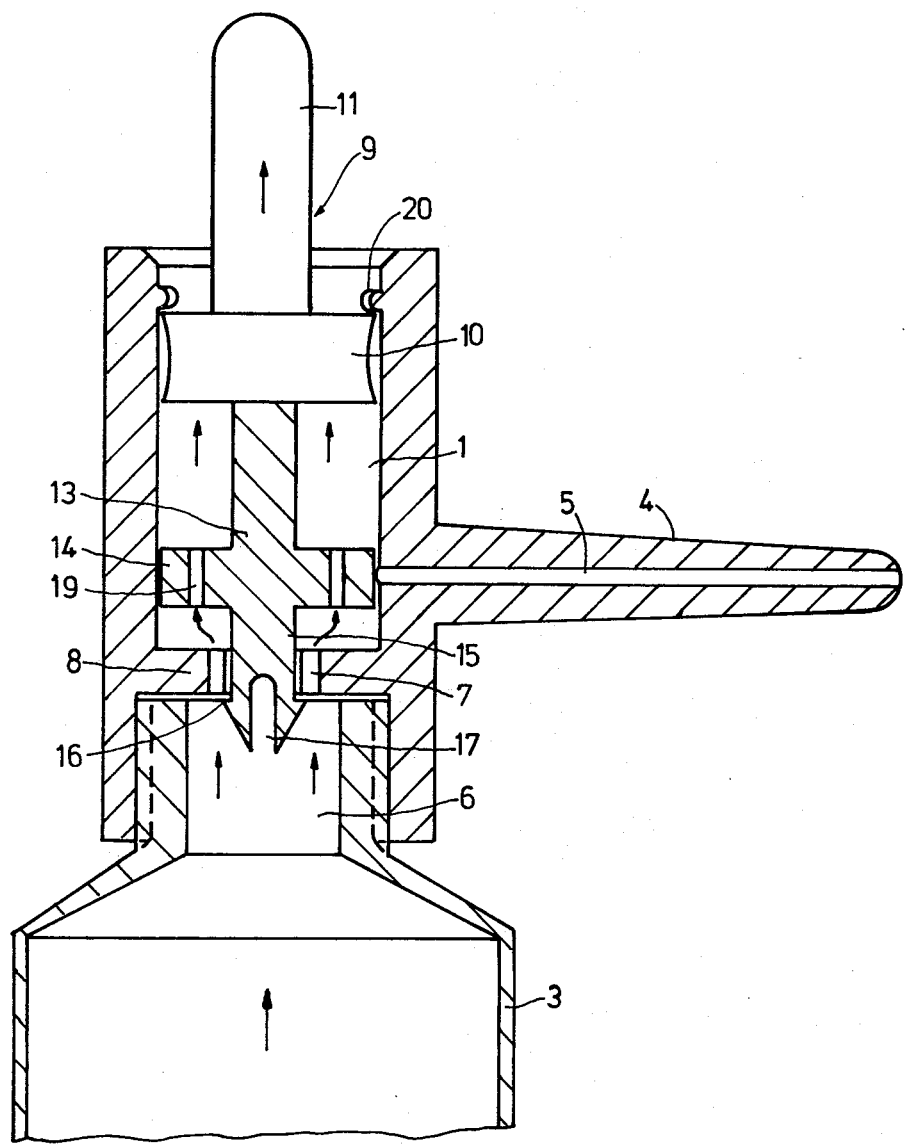
FIG. 3 shows the dispenser as a whole during filling of the metering chamber.

As shown in FIG. 1a, the metering chamber 1 is joined to the tube 3 via the screwthread 2; in other words the metering chamber is screwed on in place of the standard tube closure. A nozzle 4 with an outlet opening 5 projects from the side of the metering chamber 1. At its neck 6, the tube 3 communicates with the metering chamber 1 through inlet openings 7. These openings are essentially formed by passages of rectangular cross-section arranged in the base 8 of the metering chamber around a central bore (cf. FIG. 2).

FIG. 1b shows the plunger 9 which fits into the cylindrical metering chamber 1. It consists of the actual plunger element 10 and of an axial push rod 11 fixed thereto. The push rod 11 is hollow (bore 12).

The third component part of the dispenser is the plate valve 13 shown in FIG. 1c. It consists essentially of the circular valve plate 14 which is also adapted to the diameter of the metering chamber 1. The valve plate 14 is provided underneath with a central pin 15 which at its end is conically shaped and widened to form a collar (16). The pin 15 is formed at its end with a central recess 17. The plate valve 13 is provided on top with a pin 18 of which the diameter is slightly smaller than that of the bore 12 in the push rod 11 of the plunger 9. The valve plate 14 is also provided with axially parallel bores 19.

FIG. 2 is a plan view of the metering chamber shown in FIG. 1a. The cylindrical housing 1, the laterally projecting nozzle 4 and the cross-section of the inlet openings 7 can all be seen. In addition, FIG. 2 shows the cams 20, also shown in FIG. 1a, for limiting the travel of the plunger.

Figure 4:
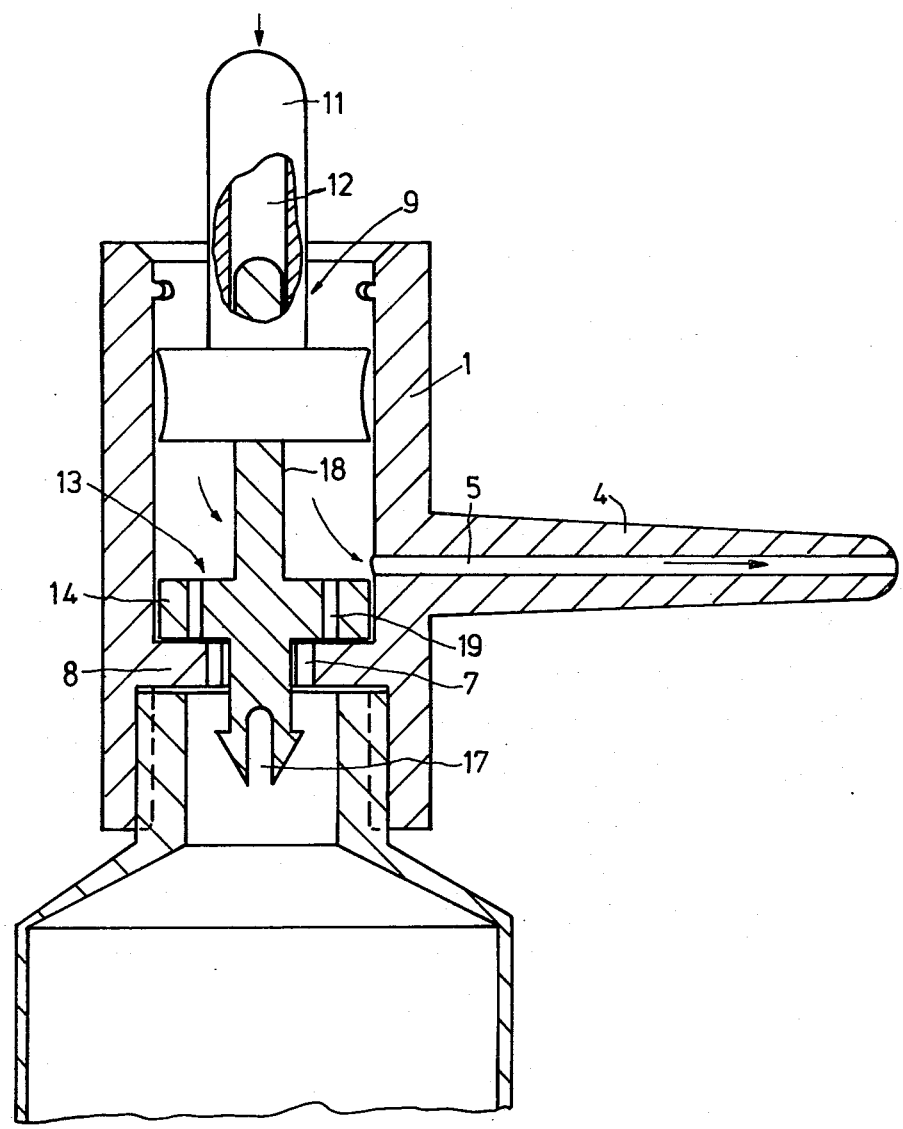
FIG. 4 shows the dispenser during emptying of the metering chamber.

FIGS. 3 and 4 show the dispenser in its assembled state. The mode of operation of the dispenser will now be described with reference to these Figures. In the rest position (starting position), the valve plate 14 rests on the base 8 of the metering chamber 1 and the plunger 9 on the surface of the valve plate 14. The height of the valve plate and of the plunger element 10 are gauged such that, in this position, the outlet opening 5 of the metering chamber 1 is closed. The inlet openings 7 in the base of the metering chamber 1 and the throughflow openings 19 in the plate valve 13 are also closed. This is achieved by the fact that the bores 19 and the inlet openings 7 are laterally offset from one another. As can be seen from FIG. 3, the length of the central pin 15 on the valve plate 14 is gauged such that the pin projects into the neck 6 of the tube 3. By applying pressure to the tube 3, the paste accommodated in the tube is forced through the inlet opening 7 beneath the valve 13 and lifts the valve together with the plunger 9 until the collar 16 of the valve pin 15 strikes the lower edge of the base 8 (FIG. 3). In this position, the valve plate 14 closes the outlet opening 5. As more pressure is applied to the tube, the paste is forced through the bores 19 in the valve plate. As a result, the plunger 9 is raised until it comes into contact with the stop cams 20. The space beneath the plunger 9 in the metering chamber 1 is now filled with paste. In other words, the stop cams 20 define the metering volume.

In the next step, the metering chamber 1 is emptied (cf. FIG. 4). To this end, the plunger 9 is pushed down by applying pressure to the pushrod 11. Under the effect of the pressure applied, the valve 13 returns to its starting position. This releases the outlet opening 5 of the metering chamber 1 and closes the inlet opening 7 in the base of the metering chamber 1. By the continued application of pressure to the pushrod 11, the piston 9 is pushed down until it is back on the valve plate 14. During this movement, the paste accommodated in the metering chamber is forced out through the outlet opening 5 (emptying phase). This principle of operation readily enables paste-like or gel-form products to be dispensed in uniform quantities from metal or plastics tubes. The simple construction provides for inexpensive mass production by injection moulding. Polystyrene is best used as the starting material.

I claim:

1. A device for dispensing paste-like substances from tubes comprising: a metering chamber having a base which is provided with inlet openings and side walls with an outlet opening and which has means screwable onto the tube, an axially displaceable plunger comprising an externally operable pushrod is disposed in the metering chamber and a plate valve having bores for the passage of the product is mounted for axial displacement in the metering chamber, the plate valve being configured to close the outlet opening during filling of the metering chamber and the inlet openings during emptying of the metering chamber.

2. A dispenser as claimed in claim 1, wherein the plate valve includes a valve plate having an axial pin underneath which projects into the neck of the tube and having a free end forming a stop to limit the travel of the valve plate.

3. A dispenser as claimed in claim 2, wherein the axial pin is slotted crosswise and conically shaped at its free end.

4. A dispenser as claimed in claim 1, wherein the inlet openings in the base of the metering chamber and the bores in the valve plate are laterally offset from one another.

5. A device for dispensing paste-like substances from a tube have a screw-threaded neck, the device comprising: means engageable with the tube neck for connecting the dispenser to the tube; means forming a metering chamber connected to connecting means and having a main axis, side walls having an outlet aperture therein and a plate having an inlet aperture therein and in communication with the tube neck when connected; a plunger axially displaceable in the metering chamber and having a pushrod axially projecting from the metering chamber; a plate valve axially slidable in the metering chamber between the base plate and the plunger and having bores therein through which substances may pass, wherein the plate valve and bores are configured to permit substances in the chamber to pass into the outlet aperture while blocking the inlet aperture when the plate valve is in a first axial position and to block the outlet aperture and permit substances to pass through the inlet aperture when the plate valve is in a second axial position; and means for limiting movement of the plate valve between the first and second axial positions.

6. The device according to claim 5, wherein the plate valve comprises a valve plate with the bores therein and abuttable against the base plate to define the first axial position and wherein the limiting means comprises a valve pin depending from the valve plate through the base plate and has a stop at the face end thereof which engages with the base plate to define the second axial position.

7. The device according to claim 6, wherein the pin is slotted crosswise and conically shaped to the free end thereof.

8. The device according to claim 5, wherein the inlet aperture in the base plate and the bores in the valve plate are radially offset.

* * * * *